United States Patent
Lin (10) Patent No.: US 11,435,480 B2
(45) Date of Patent: Sep. 6, 2022

(54) MAP CONSTRUCTION METHOD AND ROBOT

(71) Applicant: SHENZHEN SILVER STAR INTELLIGENT TECHNOLOGY CO., LTD., Guangdong (CN)

(72) Inventor: Lize Lin, Shenzhen (CN)

(73) Assignee: SHENZHEN SILVER STAR INTELLIGENT TECHNOLOGY CO., LTD., Shenzhen (CN)

( * ) Notice: Subject to any disclaimer, the term of this patent is extended or adjusted under 35 U.S.C. 154(b) by 466 days.

(21) Appl. No.: 16/448,293

(22) Filed: Jun. 21, 2019

(65) Prior Publication Data

US 2020/0081125 A1 Mar. 12, 2020

(30) Foreign Application Priority Data

Sep. 7, 2018 (CN) .......................... 201811044683.5

(51) Int. Cl.
*G01S 17/89* (2020.01)
*G01S 17/93* (2020.01)
(Continued)

(52) U.S. Cl.
CPC ............ *G01S 17/89* (2013.01); *G01S 17/931* (2020.01); *G05D 1/024* (2013.01); *G06V 20/10* (2022.01)

(58) Field of Classification Search
CPC ..... G01S 17/89; G01S 17/931; G05D 1/0246; G05D 1/024; G05D 2201/0203;
(Continued)

(56) References Cited

U.S. PATENT DOCUMENTS 9,233,469 B2 * 1/2016 Lee .................. G06N 20/00
2018/0158235 A1 * 6/2018 Wu .................. G06T 19/20
(Continued)

FOREIGN PATENT DOCUMENTS

CN 104267728 A 1/2015
CN 104267728 A * 1/2015
(Continued)

OTHER PUBLICATIONS

Cunha et al., Using a Depth Camera for Indoor Robot Localization and Navigation, Jun. 2011, ResearchGate, 2-5 (Year: 2011).*
(Continued)

*Primary Examiner* — Anne Marie Antonucci
*Assistant Examiner* — Connor L Knight
(74) *Attorney, Agent, or Firm* — Conley Rose, P. C.; Grant Rodolph (57) ABSTRACT

A map construction method and a robot are provided. The map construction method includes: acquiring a two-dimensional point cloud image of a motion space, wherein the two-dimensional point cloud image is a data set composed of several point cloud data; determining a wall in the motion space according to the two-dimensional point cloud image; determining a main traveling direction according to the wall. The method adds up a function for searching the main traveling direction, and can provide the robot with optimal main traveling direction, which makes the map composition smoother, more regular and intuitive, and conforms to people's using habits, thereby facilitating improving the user experience.

17 Claims, 7 Drawing Sheets

(51) Int. Cl.
*G05D 1/02* (2020.01)
*G06K 9/00* (2022.01)
*G01S 17/931* (2020.01)
*G06V 20/10* (2022.01)

(58) Field of Classification Search
CPC .. G05D 1/0274; G05D 1/0214; G05D 1/0238;
G05D 1/02; G05D 2201/02; G05D 3/00;
G06K 9/00664; G01C 21/32; G06T 11/20
See application file for complete search history.

(56) References Cited

U.S. PATENT DOCUMENTS

| | | | |
|---|---|---|---|
| 2019/0324474 A1* | 10/2019 | Wendt | G05D 1/0219 |
| 2021/0089040 A1* | 3/2021 | Ebrahimi Afrouzi | A47L 9/2894 |

FOREIGN PATENT DOCUMENTS

| | | | | | |
|---|---|---|---|---|---|
| CN | 105336002 | A | | 2/2016 | |
| CN | 105467992 | A | | 4/2016 | |
| CN | 105547166 | A | | 5/2016 | |
| CN | 106020208 | A | | 10/2016 | |
| CN | 106204705 | A | | 12/2016 | |
| CN | 106204705 | A | * | 12/2016 | |
| CN | 106527424 | A | | 3/2017 | |
| CN | 106780748 | A | | 5/2017 | |
| CN | 108332660 | A | * | 7/2018 | ........... G01B 11/005 |
| CN | 108389250 | A | | 8/2018 | |
| CN | 108416785 | A | * | 8/2018 | |
| CN | 108984741 | A | * | 12/2018 | |
| KR | 100187252 | B1 | * | 5/1999 | ........... G06T 3/0037 |
| KR | 100210061 | B1 | * | 7/1999 | |
| KR | 101281512 | B1 | * | 7/2013 | ............ G06T 15/00 |
| WO | 2017121936 | A1 | | 7/2017 | |

OTHER PUBLICATIONS

Machine Translation: KR-101281512-B1 (year:2013).*
Machine Translation: KR-100210061-B1 (year:1999).*
Machine Translation: KR-100187252-B1 (year:1999).*
Zhang, Y., et al., "Intelligent Vehicle Transportation System," Beijing University of Technology Press, Beijing, 978-7-5639-2457-8, Apr. 2011, 3 pages.

* cited by examiner

MAP CONSTRUCTION METHOD AND ROBOT

CROSS-REFERENCE TO RELATED APPLICATIONS

This application claims priority to Chinese Patent Application No. 201811044683.5 filed on Sep. 7, 2018, which is incorporated by reference herein as if reproduced in its entirety.

TECHNICAL FIELD

The present application relates to the technical field of automation control, and in particularly to a map construction method and a robot.

BACKGROUND

SLAM (simultaneous localization and mapping) is a related method for realizing the following problem: placing a robot at an unknown location in an unknown environment, allowing the robot to gradually draw a complete map of the environment, and to travel to each accessible corner or area without suffering from obstacles.

SLAM has been widely used in the field of robots related to intelligent sweeping robots etc., and it is a hot research topic nowadays. In the course of motion, an existing sweeping robot and the like usually adopt a random scanning method for randomly determining obstacle situation in the vicinity thereof to construct a map, and finally determine a travel path for the robot according to the structure of the map constructed.

Such map construction and corresponding travel path are random, and the leveling and regularity of the mapping are insufficient to meet people's daily use requirements, thus the user experience is poor.

SUMMARY

Embodiments of the present application provide a map construction method and a robot, which aim to solve the technical problems that random map construction is strong and the traveling of the robot is not smooth and regular in the prior art.

In order to solve the above technical problems, the embodiments of the present application provide the following technical solution: a map construction method. The map construction method includes acquiring a two-dimensional point cloud image of a motion space, wherein the two-dimensional point cloud image is a data set composed of several point cloud data, determining a wall in the motion space according to the two-dimensional point cloud image, and determining a main traveling direction according to the wall.

Optionally, the step of determining the wall in the motion space according to the two-dimensional point cloud image includes determining a search range according to a measuring range of an acquisition device of the two-dimensional point cloud image, finding out a line segment having the longest length within the search range, and determining the line segment having the longest length as the wall in the motion space.

Optionally, the step of determining the search range according to the measuring range of the acquisition device of the two-dimensional point cloud image includes converting the point cloud data into polar coordinate points $p\_1(r, \theta)$ under a polar coordinate system, where an origin of the polar coordinate system is a current position, $\theta$ is an angle between a current orientation and an initial direction, and r is a distance between the origin and the point cloud data in the current orientation, converting a point set represented by polar coordinates into rectangular coordinate points $p\_2(x, y)$ under a rectangular coordinate system, where x and y are respectively integer multiples of a resolution for converting the point cloud data into the rectangular coordinate points, and determining the search range at different angles according to a minimum measuring range and a maximum measuring range of the acquisition device, where, the angle ranges from 0 degrees (°) to 360°. A starting point of the search range is $A(MIN\_R*\cos(\theta), MIN\_R*\sin(\theta))$, and an end point of the search range is $B(MAX\_R*\cos(\theta), MAX\_R*\sin(\theta))$. MIN_R is the minimum measuring range, MAX_R is the maximum measuring range, and $\theta$ is a value of the angle.

Optionally, the step of finding out the line segment having the longest length within the search range includes spacing n perpendicular lines at an equal interval within the line segment formed by a start point A and an end point B in the search range, where the interval between the perpendicular lines is the resolution for converting, and n is an positive integer, determining, according to linear equations of the perpendicular lines in the rectangular coordinate system, whether the point cloud data falls onto the perpendicular lines, counting quantity of the point cloud data on each of the perpendicular lines, determining the perpendicular line having a maximum quantity of the point cloud data as a candidate line segment at the current angle, calculating the candidate line segments for each angle in turn, and selecting the line segment having the longest length among the candidate line segments as the longest line segment in the searchrange.

Optionally, the angle between the main traveling direction and the current orientation is an angle corresponding to the longest line segment in the search range, and the initial direction is arranged as 0.

Optionally, the step of finding out the line segment having the longest length within the search range includes respectively calculating out the longest point cloud line segments in each direction as candidate line segments in the search range and selecting the longest candidate line segment among the candidate line segments as the longest line segment in the searchrange.

Optionally, the step of respectively calculating out the longest point cloud line segments in each direction in the search range includes generating n perpendicular lines at an equal interval on a straight line in the current direction by a preset step size, where n is a positive integer, calculating quantity of the point cloud data falling onto each of the perpendicular lines, determining the perpendicular line with the largest quantity of point cloud data as the longest point cloud line segment in the current direction, and calculating the length of the point cloud line segment according to a distance among the point cloud data on the perpendicular line.

Optionally, after the step of calculating the quantity of the point cloud data falling onto the perpendicular lines, the method further includes determining whether the quantity of the point cloud data of each one of the perpendicular lines is greater than a preset threshold, determining the one of the perpendicular lines as an effective perpendicular line if the quantity of the point cloud data of one of the perpendicular lines is greater than the preset threshold, or otherwise determining the one of the perpendicular lines as an invalid perpendicular line.

In order to solve the above technical problems, embodiments of the present application further provide the following technical solution, a robot. The robot includes a robot body, provided with a traveling mechanism, a sensor, disposed on the robot body for acquiring a two-dimensional point cloud image in a motion space, and a control chip, arranged inside the robot body and connected to the sensor, wherein the control chip is configured to perform the above-described map construction method based on data collected by the environment sensor to determine the main traveling direction, and configured to control the traveling mechanism to cause the robot to travel along the main traveling direction until reaching the wall.

Optionally, the sensor is a laser sensor or a Red, Blue, Green Depth (RGBD) camera.

Optionally, wherein, the two-dimensional point cloud image is a two-dimensional data set of an intersection of a signal and an obstacle after the sensor transmits the signal at an angle of from 0° to 360°.

Optionally, the control chip is further configured to cause the robot to travel according to a preset motion path after the robot travels along the main traveling direction until reaching the wall.

Compared with the prior art, the map construction method provided by the embodiments of the present application introduces a function for searching the main traveling direction, and can cause the robot to travel along the main traveling direction during traveling until the robot direction, and can cause the robot to travel along the main traveling direction during traveling until the robot touches or reaches the wall, and continue to travel based on the predetermined motion path, which makes the map composition smoother, more regular and intuitive, and more in line with people's understanding, and can better meet people's daily use requirements, thereby improving the user experience.

DESCRIPTION OF THE DRAWINGS

One or more embodiments are exemplified by the figures in their corresponding accompanying drawings, and these exemplary descriptions do not constitute a limitation to the embodiments. Like reference number signs in the accompanying drawings denote like elements unless otherwise stated, and the figures in the accompanying drawings do not constitute a scale limitation.

DETAILED DESCRIPTION

In order to facilitate the understanding of the present application, the present application will be described in more detail below with reference to the accompanying drawings and specific embodiments. It should be noted that, when an element is described as "being fixed to" another element, it may be directly on said another element, or there may be one or more intermediate elements existing there between. When an element is described as "being connected to" another element, it may be directly connected to said another element, or there may be one or more intermediate elements existing there between. The orientation or position relationship indicated by the term "upper", "lower", "inner", "outer", "bottom" or the like as used in the specification is based on the orientation or position relationship as shown in the accompany drawings, which is only for convenience of description, but not to indicate or suggest that the indicated device or element has to be provided in a particular orientation or be constructed and operated in a particular orientation, thus it cannot be construed as limitation to the application. Moreover, the term "first", "second", "third" or the like is used for descriptive purposes only and cannot be construed as indicating or suggesting relative importance.

Unless otherwise defined, all technical terms and scientific terms used in the present specification have the same meanings as the meanings generally understood by those who have ordinary skill in the technical field of the present application. In the specification, the terms used in the specification of the present application are for the purpose of describing particular embodiments and are not intended to limit the present application. The term "and/or" used in the present specification includes any and all combinations of one or more of associated items listed.

Further, the technical features involved in the different embodiments of the present application described below may be combined with each other as long as they do not constitute a conflict with each other.

Figure 1:
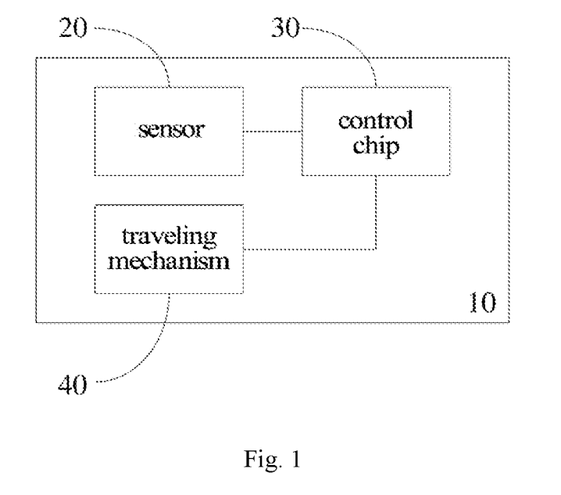
FIG. 1 is a block diagram of hardware of a robot provided by an embodiment of the present application.

FIG. 1 is a structural block diagram of a robot provided by an embodiment of the present application. As shown in FIG. 1, the robot may include a robot body 10, a sensor 20, a control chip 30, and a traveling mechanism 40.

The robot body 10 is a main structure of the robot, and corresponding shape, structure, and manufacturing material (such as rigid plastic or metal such as aluminum, iron, or the like) can be selected according to actual needs of the robot, for example, the main structure may be arranged as a flat cylinder which is common to the sweeping robot.

The traveling mechanism 40 is a structural device arranged on the robot body 10 to provide the robot with the ability to move. The traveling mechanism 40 may be implemented specifically by any type of mobile device, such as a roller, a crawler, or the like.

In this embodiment, the robot body 10 is further provided with a sensor 20 thereon. The sensor 20 is a data acquisition device for sensing an external environment and providing a two-dimensional point cloud image in a motion space for mapping.

The sensor 20 may specifically adopt any type of existing depth information acquisition devices, which includes but is not limited to a laser sensor and an RGBD camera. The motion space refers to a surrounding space of the current position of the robot. There may be provided with one or more sensors 20, to satisfy an omnidirectional detection range with an angle from 0° to 360°.

The control chip 30 is an electronic computing core arranged inside the robot body 10 for performing a logical operation step to implement intelligent control of the robot. In this embodiment, the control chip 30 is connected to the sensor 20, is configured to execute a preset algorithm to perform map construction according to the data acquired by the environmental sensor, and is configured to control the travelling mechanism 40 according to the map such that the robot moves based on an appropriate path.

Figure 2:
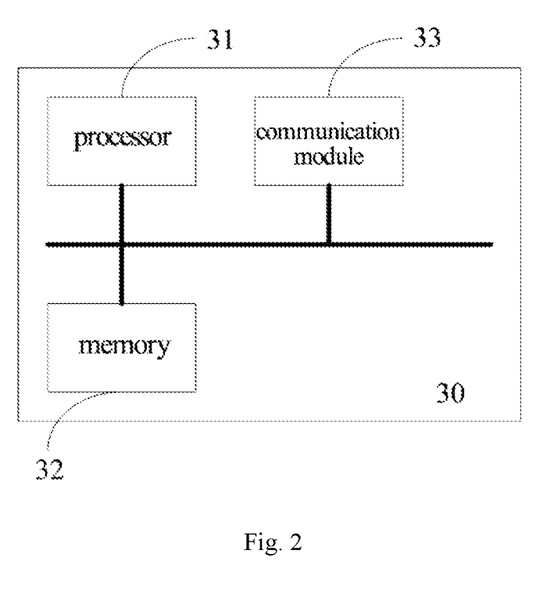
FIG. 2 is a block diagram of hardware of a control chip provided by an embodiment of the present application.

FIG. 2 is a structural block diagram of a control chip 30 provided by an embodiment of the present application. As shown in FIG. 2, the control chip 30 may include a processor 31, a memory 32, and a communication module 33.

The processor 31, the memory 32, and the communication module 33 establish a communication connection between each two thereof by means of a bus.

The processor 31 may be any type of single-threaded or multi-threaded processor. The processor 31 may have one or more processing cores as a control hub for acquiring data, performing a logical operation function and issuing an arithmetic processing result and the like.

The memory 32 is a non-transitory computer readable storage medium, such as at least one magnetic disk storage device, flash memory device, distributed storage device remotely disposed with respect to the processor 31, or other non-volatile solid-state storage device, and the like. It has a program storage area for storing a non-volatile software program, a non-volatile computer executable program, and a module.

These computer executable program and functional module may be invoked by the processor 31 to cause the processor 31 to perform one or more method steps. The memory 32 may also have a data storage area for storing the arithmetic processing result issued by the processor 31.

The communication module 33 is a hardware module for establishing a communication connection between the control chip 30 and the external function module. The communication module 33 may select a corresponding type of wireless or wired communication module, such as a WiFi module, a Bluetooth module, or an input/output interface etc., according to actual needs.

Based on the communication module 33, the control chip 30 may collect a user instruction and present a corresponding interactive interface to the user. For example, the control chip 30 may establish a connection with the user's intelligent mobile terminal through the WiFi module, and collect the user instruction or display a current working state of the robot to the user in a manner of an APP or a webpage.

Based on the two-dimensional point cloud image provided by the sensor, the control chip 30 may perform the map construction method provided by the embodiment of the present application, increase a function for searching the main direction during the map construction process, and control the robot according to this such that the robot, for example a sweeping robot, etc., has amore intuitive motion path and provides a better user experience.

It should be noted that, according to the task to be completed, in addition to the above functional modules, the robot body 10 may also be equipped with one or more other different functional modules to cooperate with each other to perform corresponding tasks (such as a water storage tank, or a cleaning device).

Figure 3:
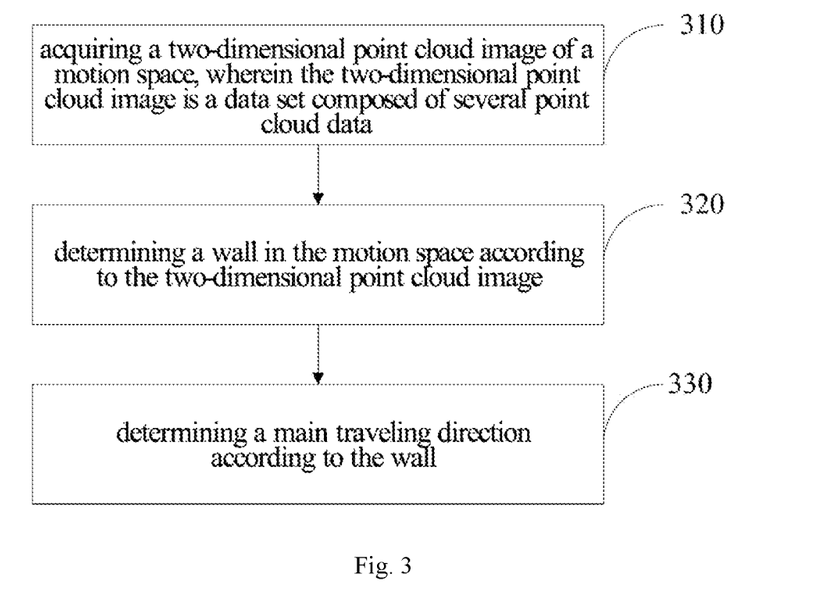
FIG. 3 is a flowchart of a map construction method provided by an embodiment of the present application.

FIG. 3 is a map construction method provided by an embodiment of the present application. The map construction method may be executed by the control chip 30 to achieve a more regular and smooth robot motion mode. As shown in FIG. 3, the map construction method may include the following steps.

Step 310 includes acquiring a two-dimensional point cloud image of a motion space, wherein the two-dimensional point cloud image is a data set composed of several point cloud data.

The motion space refers to the unknown environment in which the robot as shown in FIG. 1 is located, and is the space in which the robot moves. There may be many different obstacles in the motion space, such as a wall. Different obstacles have different lengths, whereby the robot may collect the point cloud data corresponding to the obstacles based on the mounted sensor, thereby completing operations of the map construction.

Specifically, the two-dimensional point cloud image may be a two-dimensional data set composed of an intersection of a signal and the obstacle after the signal is transmitted by the sensor at an angle ranging from 0 degrees to 360 degrees. The sensor may be arranged on the top of the robot body and collect the two-dimensional point cloud data through rotating 360° by itself.

Step 320 includes determining a wall in the motion space according to the two-dimensional point cloud image.

The point cloud data in the two-dimensional point cloud image provides depth information in the current motion space, which indicates the length of the obstacle, the change in the distance from the obstacle, and the like. Based on structural characteristics of different obstacles, for example, the wall has a very long extension, appearing as a long boundary or an object, then the structural characteristics may be analyzed and the wall included in the two-dimensional point cloud image may be determined.

Step 330 includes determining a main traveling direction according to the wall.

After determining the wall in the current motion space, the control chip determines its main traveling direction according to a relative position relationship between the current position of the robot and these walls, and thereby instructs the robot to move.

In this embodiment, the "main traveling direction" refers to a reference orientation that should be followed during the movement of the robot, and the robot is kept moving along the main traveling direction without blocking of other obstacles or special circumstances.

Through the main traveling direction, travelling randomness of the robot can be greatly reduced, and the general orientation of the robot movement is determined, which can make the traveling or map construction more smooth and regular, intuitive and meet the user's requirements, and the user experience is better.

It could be understood that, since the wall in the motion space will be presented as a line segment formed by a plurality of point clouds in the two-dimensional point cloud image, the line segment is generally longer than other objects in the motion space.

Therefore, in some embodiments, the wall in the motion space may be determined in the two-dimensional point cloud image, specifically, through the following mode.

First, a search range is determined according to a measuring range of an acquisition device of the two-dimensional point cloud image. Then, a line segment having the longest length within the search range is found out. Finally, the line segment having the longest length is determined as the wall in the motion space. That is, within the search range, the longest line segment in the two-dimensional point cloud image is found as the wall by a traversal method, and the main direction is determined accordingly.

Specifically, the foregoing finding of the longest line segment within the search range may be divided into the following two steps.

I. In the search range, the longest point cloud line segments in each direction are respectively calculated out as candidate line segments.

The two-dimensional point cloud image acquired by the sensor 20 is an image over an angle range (such as the angle range of 0°-360° described above). A plurality of different directions (i.e., the moving direction of the robot) may be determined within the search range according to a preset step size (for example, 1° or 0.5°).

II. Among the candidate line segments, the longest candidate line segment is selected as the longest line segment in the searchrange.

After traversing the candidate line segments in each direction respectively, a complete candidate set is formed, and the longest line segment in the candidate set is selected through comparison so as to complete the task of finding the longest line segment within the searchrange.

Figure 4:
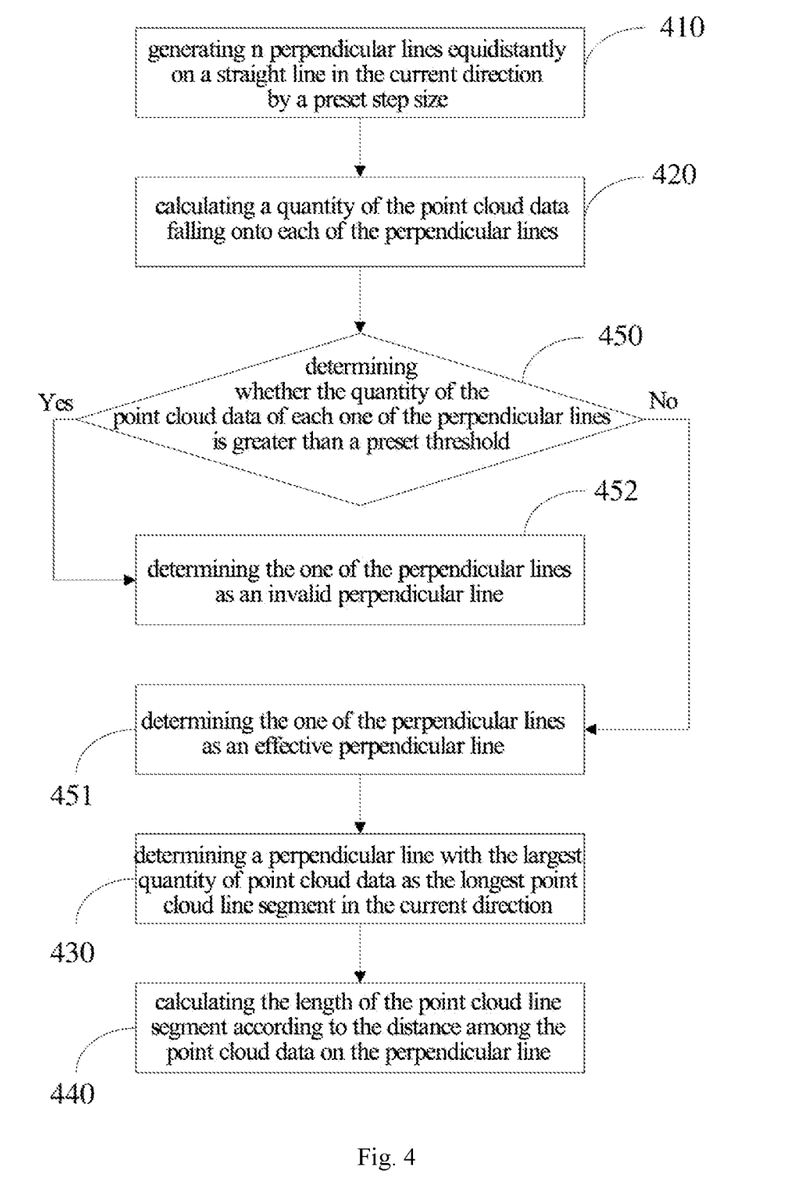
FIG. 4 is a flowchart of a map construction method provided by another embodiment of the present application.

FIG. 4 is a flowchart of a method for calculating candidate line segments provided by an embodiment of the present application. As shown in FIG. 4, the method for calculating the candidate line segments may include the following steps.

Step 410 includes generating n perpendicular lines equidistantly on a straight line in the current direction by a preset step size, where n is a positive integer.

The preset step size is an empirical value indicating the resolution of the search, which may be set or adjusted by a person skilled in the art according to actual applications. For example, the step size may be set as 0.05 meters (m).

The current direction is the direction corresponding to the orientation of the robot currently calculated out. The projection of the search range in the current direction is a line segment of the line. It could be understood that, the n perpendicular lines are arranged on the line segment (i.e., kept within the search range).

Step 420 includes calculating a quantity of the point cloud data falling onto each of the perpendicular lines.

The perpendicular lines extend to both ends and thus will pass through the limited quantity of point cloud data. The control chip may determine whether the point cloud data belongs to one of the perpendicular lines based on the geometric relationship, thereby realizing the quantity statistics of the point cloud data.

Step 430 includes determining a perpendicular line with the largest quantity of point cloud data as the longest point cloud line segment in the current direction.

Since the perpendicular line with more point cloud data always has a longer length, after the quantity of point cloud data is respectively passed through by then perpendicular lines, i.e., from 1 to n, is acquired, the perpendicular line having the largest quantity of point cloud data is selected as the straight line where the candidate line segment is located.

Step 440 includes calculating the length of the point cloud line segment according to the distance among the point cloud data on the perpendicular line.

After determining the perpendicular line where the candidate line segment is located, the farthest distance between the point cloud data of any two points on the perpendicular line is the length of the point cloud line segment.

Preferably, the method for calculating candidate line segments may further include an additional detection step in order to reduce erroneous determinations and the amount of calculation. With continued reference to FIG. 4, after the step 420, the method further includes at step 450, determining whether the quantity of the point cloud data of each one of the perpendicular lines is greater than a preset threshold, and performing step 452 if the quantity of the point cloud data of one of the perpendicular lines is greater than the preset threshold, otherwise performing step 451 if the quantity of the point cloud data of one of the perpendicular lines is not greater than the preset threshold.

The preset threshold is an empirical value, which may be set by a person skilled in the art according to actual applications. It is related to the density of the point cloud data collected by the sensor 20, and it is usually necessary for the two-dimensional point cloud image with a higher density to set a higher preset threshold.

Step 451 includes determining the one of the perpendicular lines as an effective perpendicular line that participates in the calculation of the step 430.

Step 452 includes determining the one of the perpendicular lines as an invalid perpendicular line that will be not considered in the step 430.

Through the above-mentioned pre-detection step, the point cloud line segment which is obviously not the wall can be excluded, thereby achieving the effect of reducing the calculation amount and avoiding the erroneous determination.

It should be noted that, the map construction method provided by the embodiments of the present application may be performed by one or more functional modules of the control chip 30. The various steps described in connection with the embodiments disclosed herein may be implemented by means of electronic hardware, computer software, or a combination of both. In order to clearly illustrate the interchangeability of hardware and software, the composition and steps of the various examples are generally described based on their function in the above description. Whether these functions are performed by means of hardware or software depends on specific applications and design constraints of the technical solutions. Those skilled in the art can also use different methods to implement the described functions for each of the specific applications, but such implementations should not be considered to be beyond the scope of the present application.

Figure 5:
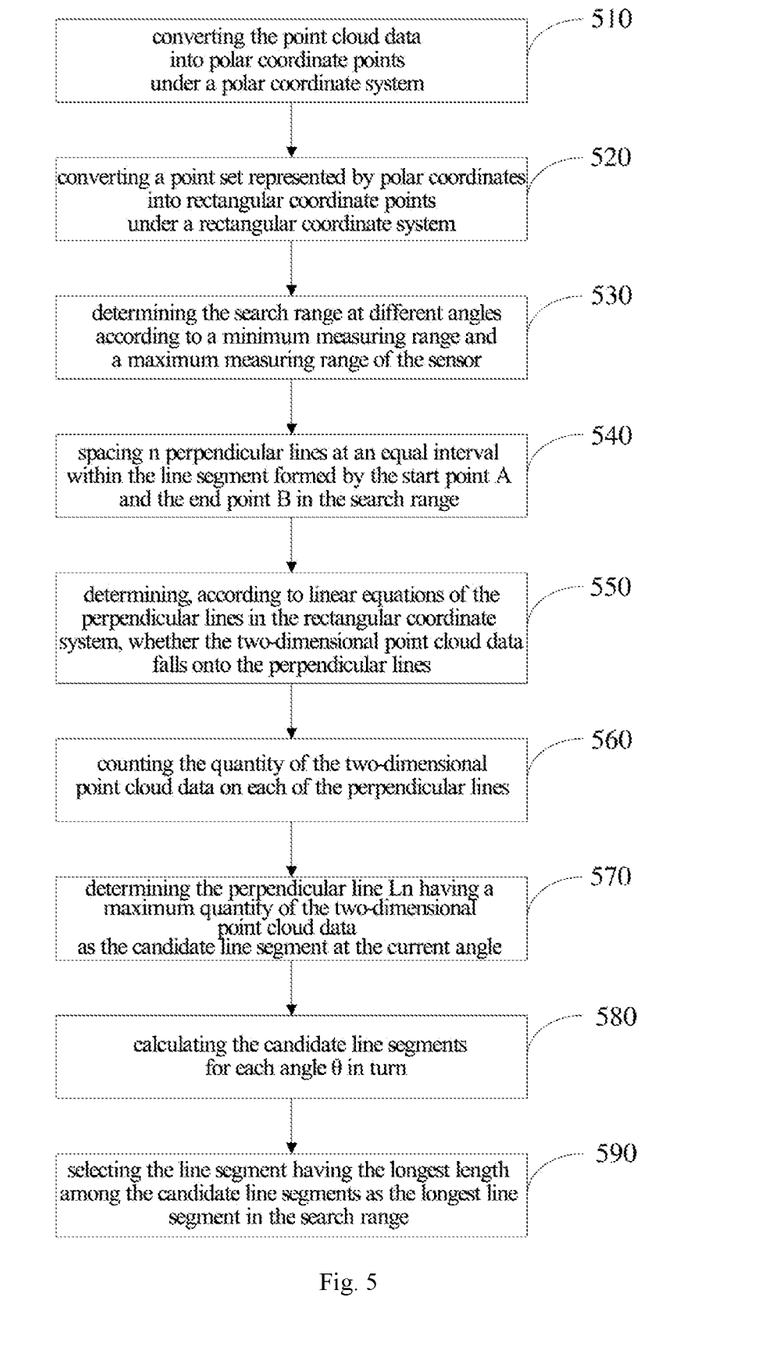
FIG. 5 is a flowchart of a method for searching a main direction of travel provided by an embodiment of the present application.

The process of the control chip 30 searching for the main traveling direction will be described in detail below with reference to a specific example. It should be noted that, the method for searching for the main traveling direction may be combined with any existing type of map construction algorithm to provide the main traveling direction for the robot. As shown in FIG. 5, the process of searching for the main traveling direction includes the following steps.

Step 510 includes converting the point cloud data into polar coordinate points $p\_1(r, \theta)$ under a polar coordinate system.

Where, an origin of the polar coordinate system is the current position, $\theta$ is an angle between the current orientation and the initial direction, and r is the distance between the origin and the point cloud data in the current orientation.

Step 520 includes converting a point set represented by polar coordinates into rectangular coordinate points $p\_2(x, y)$ under a rectangular coordinate system.

Where, x and y in the converted rectangular coordinate system are not continuous values, but are respectively integer multiples of the resolution for converting the point cloud data into the rectangular coordinate points, that is, the point cloud data is converted by a certain step size for searching to acquire corresponding rectangular coordinate points to indicate position information of the obstacle. Provided RES is the resolution, the value of which may be selected according to the need of the actual situation, for example, RES=0.05 m.

Step 530 includes determining the search range at different angles according to a minimum measuring range and a maximum measuring range of the sensor.

Where the angle ranges from 0° to 360°, a starting point of the search range is A(MIN_R*cos(θ), MIN_R*sin(θ)), an end point of the search range is B(MAX_R*cos(θ), MAX_R*sin(θ)); MIN_R is the minimum measuring range, MAX_R is the maximum measuring range, θ is the value of the angle, and the start point A and the end point B are points under the rectangular coordinate system.

Through adopting the polar coordinates in step 510, (A, B, θ) may be determined by the minimum measuring range and the maximum measuring range of the sensor 20 at a particular moment when the angle between the direction of the robot and the initial direction is known.

Step 540 includes spacing n perpendicular lines at an equal interval within the line segment formed by the start point A and the end point B in the search range.

Figure 6:
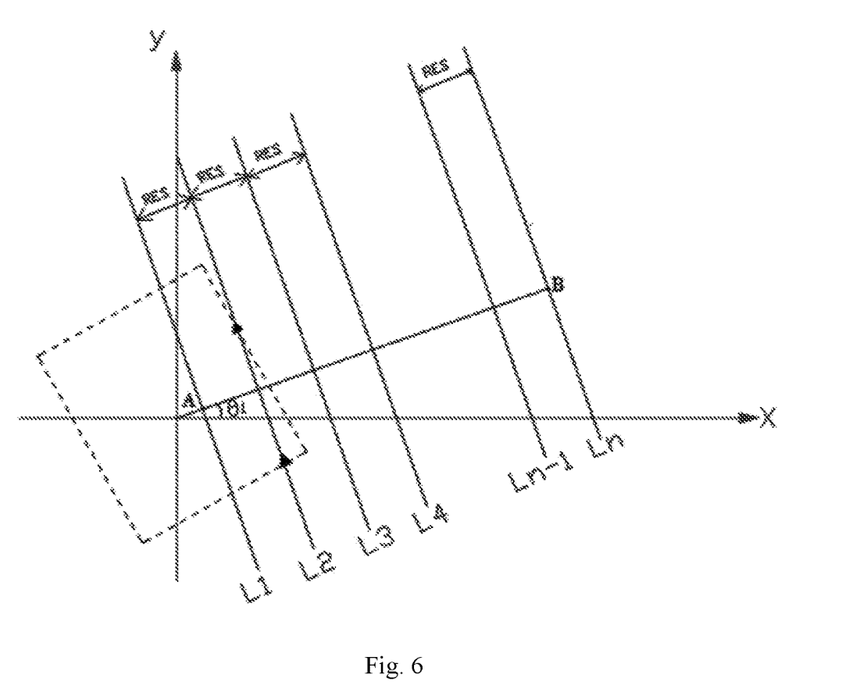
FIG. 6 is a schematic diagram of dividing a line segment AB when an angle is taken as θ1 provided by an embodiment of the present application.
Figure 7:
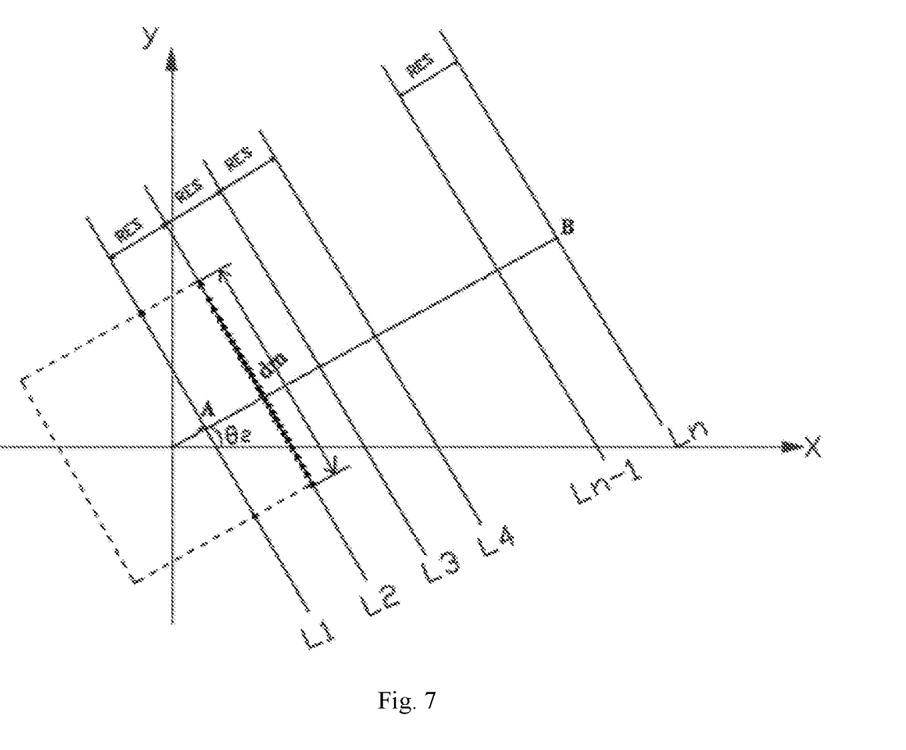
FIG. 7 is a schematic diagram of dividing a line segment AB when an angle is taken as θ2 provided by an embodiment of the present application.
Figure 8:
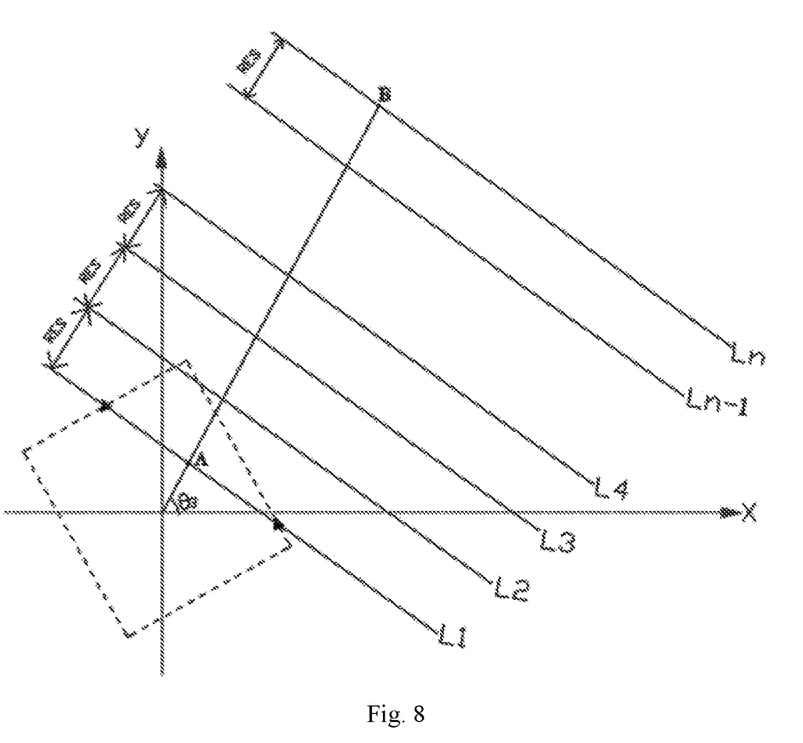
FIG. 8 is a schematic diagram of dividing a line segment AB when an angle is taken as θ3 provided by an embodiment of the present application.

FIGS. 6-8 are schematic diagrams showing the division of the line segment AB when the angle is selected as $\theta_1$, $\theta_2$, and $\theta_3$, respectively. As shown in FIGS. 6-8, the interval between the perpendicular lines is the resolution RES, n is a positive integer, and the n perpendicular lines are respectively represented by L1, L2, . . . Ln, and there will be different perpendicular lines at different angles.

Step 550 includes determining, according to linear equations of the perpendicular lines in the rectangular coordinate system, whether the two-dimensional point cloud data falls onto the perpendicular lines.

The linear equations are straight lines in the rectangular coordinate system that may be determined by an intersection of a known perpendicular line and the line segment AB, as well as the angle between said perpendicular line and the x-axis.

Step 560 includes counting the quantity, indicated as num, of the two-dimensional point cloud data on each of the perpendicular lines. The two-dimensional point cloud data on each of the perpendicular lines refers to the number of the point cloud data p_2.

Step 570 includes determining the perpendicular line Ln having a maximum quantity of the two-dimensional point cloud data as the candidate line segment at the current angle.

Preferably, a threshold may also be preset according to the density of the point cloud data for determining whether the perpendicular lines are valid. Only when the quantity of the two-dimensional point cloud data passed by one of the perpendicular lines is greater than the threshold, the one of the perpendicular lines is determined to be an effective perpendicular line and may be selected as the candidate line segment. When the quantity is less than the threshold, the one of the perpendicular lines is determined to be an invalid perpendicular line and is ignored.

The length dm of the candidate line segment at each angle may be calculated and acquired from the distance between the two point cloud data farthest away on said perpendicular line.

Step 580 includes calculating the candidate line segments for each angle in turn. Where, θ ranges from 0° to 360°.

The above steps 510-570 are repeatedly performed for each angle θ to determine the perpendicular lines where the candidate line segments are located and calculate the lengths dm of the candidate line segments (for example, as shown in FIG. 7).

Step 590 includes selecting the line segment having the longest length among the candidate line segments as the longest line segment in the search range. Through comparing the lengths among the candidate line segments calculated by the step 580, the target line segment having the longest length may be selected, the corresponding angle of which is θm.

After determining the target line segment, provided that the initial direction of the robot is 0°, then the angle between the main traveling direction and the current orientation of the robot is θm. Of course, after finding out the main traveling direction, the control chip may further control the robot to move according to a preset motion path after the robot travels along the main traveling direction until reaching the wall, so as to reduce random traveling of the robot.

In conclusion, the map construction method provided by the embodiments of the present application can provide the optimal main traveling direction for the robot, so that the map construction is smoother, more regular and intuitive, and conforms to the user's usage habits, which is beneficial to improve the user experience.

It should be finally noted that, the above embodiments are only used to illustrate the technical solutions of the present application, and are not to limit the present application. In the idea of the present application, the technical features in the above embodiments or different embodiments may also be combined, and the steps may be implemented in any sequence, and there may be many other variations of the various aspects of the present application as described above, which are not provided in the details for brevity. Although the present application has been described in detail with reference to the foregoing embodiments, it should be understood by those skilled in the art that the technical solutions described in the foregoing embodiments may still be modified, or a part of the technical features may be equivalently substituted, and these modifications or substitutions do not deviate the nature of corresponding technical solutions from the scope of the technical solutions of the various embodiments of the present application.

What is claimed is:

1. A map construction method, executed by a control chip of a robot to achieve a motion mode for the robot, comprising:

acquiring a two-dimensional point cloud image of a motion space, wherein the two-dimensional point cloud image is a data set composed of several point cloud data;

determining a wall in the motion space according to the two-dimensional point cloud image;

determining a main traveling direction according to the wall, wherein the main traveling direction is perpendicular to the wall; and controlling the robot to travel along the main traveling direction until reaching the wall, wherein determining the wall in the motion space according to the two-dimensional point cloud image comprises:

determining a search range according to a measuring range of an acquisition device of the two-dimensional point cloud image;

finding out a line segment having a longest length within the search range; and determining the line segment having the longest length as the wall in the motion space, wherein finding out the line segment having the longest length within the search range comprises:

respectively calculating out a longest point cloud line segment in each direction as candidate line segments in the search range; and selecting a longest candidate line segment among the candidate line segments as a longest line segment in the search range, wherein respectively calculating out the longest point cloud line segments in each direction in the search range comprises:

generating n perpendicular lines at an equal interval on a straight line in a current direction by a preset step size, wherein n is a positive integer;

calculating a quantity of the point cloud data falling onto each of the perpendicular lines;

determining the perpendicular line with a largest quantity of point cloud data as a longest point cloud line segment in the current direction; and calculating a length of a point cloud line segment according to a distance among the point cloud data on the perpendicular line.

2. The map construction method of claim 1, wherein determining the search range according to the measuring range of the acquisition device of the two-dimensional point cloud image comprises:

converting the point cloud data into polar coordinate points p_1(r, θ) under a polar coordinate system, wherein an origin of the polar coordinate system is a current position, wherein θ is an angle between a current orientation and an initial direction, wherein the angle ranges from 0° to 360°, and wherein r is a distance between the origin and the point cloud data in the current orientation;

converting a point set represented by polar coordinates into rectangular coordinate points p_2(x, y) under a rectangular coordinate system, wherein x and y are respectively integer multiples of a resolution for converting the point cloud data into the rectangular coordinate points; and determining the search range at different angles according to a minimum measuring range and a maximum measuring range of the acquisition device, wherein a starting point of the search range is A(MIN_R*cos(θ), MIN_R*sin(θ)), wherein an end point of the search range is B(MAX_R*cos(θ), MAX_R*sin(θ)), and wherein MIN_R is the minimum measuring range, MAX_R is the maximum measuring range, and θ is a value of the angle.

3. The map construction method of claim 2, wherein finding out the line segment having the longest length within the search range comprises:

spacing n perpendicular lines at an equal interval within the line segment formed by the start point A and the end point B in the search range, wherein an interval between the perpendicular lines is the resolution for converting, and wherein n is a positive integer;

determining, according to linear equations of the perpendicular lines in the rectangular coordinate system, whether the point cloud data falls onto the perpendicular lines;

counting a quantity of the point cloud data on each one of the perpendicular lines;

determining the perpendicular line having a maximum quantity of the point cloud data as a candidate line segment at a current angle;

calculating the candidate line segments for each angle in turn; and selecting the line segment having the longest length among the candidate line segments as a longest line segment in the search range.

4. The map construction method of claim 3, wherein the angle between the main traveling direction and the current orientation is an angle corresponding to the longest line segment in the search range, and wherein the initial direction is arranged as 0 degrees.

5. The map construction method of claim 3, wherein the angle between the main traveling direction and the current orientation is an angle corresponding to the longest line segment in the search range, and wherein the initial direction is arranged as 0 degrees.

6. The map construction method of claim 1, wherein the two-dimensional point cloud image is a two-dimensional data set of an intersection of a signal and an obstacle after the sensor transmits the signal at an angle from 0° to 360°.

7. The map construction method of claim 1, wherein the sensor is a laser sensor or an RGBD camera.

8. The map construction method of claim 1, further comprising causing the robot to travel according to a preset motion path after the robot travels along the main traveling direction until reaching the wall.

9. The map construction method of claim 1, wherein after calculating the quantity of the point cloud data falling onto the perpendicular lines, the method further comprises:

determining whether the quantity of the point cloud data of each one of the perpendicular lines is greater than a preset threshold;

determining one of the perpendicular lines as an effective perpendicular line if the quantity of the point cloud data of one of the perpendicular lines is greater than the preset threshold; and determining one of the perpendicular lines as an invalid perpendicular line if the quantity of the point cloud data of one of the perpendicular lines is not greater than the preset threshold.

10. A robot, comprising:

a robot body having a traveling mechanism;

a sensor disposed on the robot body and configured to acquire a two-dimensional point cloud image in a motion space; and a control chip arranged inside the robot body, coupled to the sensor, and configured to perform the following steps based on data collected by the environment sensor to determine the main traveling direction:

acquiring a two-dimensional point cloud image of a motion space, wherein the two-dimensional point cloud image is a data set composed of several point cloud data;

determining a wall in the motion space according to the two-dimensional point cloud image;

determining a main traveling direction according to the wall, wherein the main traveling direction is perpendicular to the wall, and wherein the control chip is further configured to control the traveling mechanism to cause the robot to travel along the main traveling direction until reaching the wall, wherein determining the wall in the motion space according to the two-dimensional point cloud image comprises:

determining a search range according to a measuring range of an acquisition device of the two-dimensional point cloud image; and finding out a line segment having a longest length within the search range; and determining the line segment having the longest length as the wall in the motion space, wherein finding out the line segment having the longest length within the search range comprises:

respectively calculating out a longest point cloud line segment in each direction as candidate line segments in the search range; and selecting a longest candidate line segment among the candidate line segments as a longest line segment in the search range, wherein respectively calculating out the longest point cloud line segments in each direction in the search range comprises:

generating n perpendicular lines at an equal interval on a straight line in a current direction by a preset step size, wherein n is a positive integer;

calculating a quantity of the point cloud data falling onto each one of the perpendicular lines;

determining the perpendicular line with a largest quantity of point cloud data as a longest point cloud line segment in the current direction; and calculating a length of a point cloud line segment according to a distance among the point cloud data on the perpendicular line.

11. The robot of claim 10, wherein the sensor is a laser sensor or an RGBD camera.

12. The robot of claim 10, wherein the two-dimensional point cloud image is a two-dimensional data set of an intersection of a signal and an obstacle after the sensor transmits the signal at an angle from 0° to 360°.

13. The robot of claim 10, wherein the control chip is further configured to cause the robot to travel according to a preset motion path after the robot travels along the main traveling direction until reaching the wall.

14. The robot of claim 10, wherein determining the search range according to the measuring range of the acquisition device of the two-dimensional point cloud image comprises:

converting the point cloud data into polar coordinate points $p\_1(r, \theta)$ under a polar coordinate system, wherein an origin of the polar coordinate system is a current position, wherein $\theta$ is an angle between a current orientation and an initial direction, wherein the angle ranges from 0° to 360° and wherein r is a distance between the origin and the point cloud data in the current orientation;

converting a point set represented by polar coordinates into rectangular coordinate points $p\_2(x, y)$ under a rectangular coordinate system, wherein x and y are respectively integer multiples of a resolution for converting the point cloud data into the rectangular coordinate points; and determining the search range at different angles according to a minimum measuring range and a maximum measuring range of the acquisition device, wherein a starting point of the search range is $A(MIN\_R*\cos(\theta), MIN\_R*\sin(\theta))$, wherein an end point of the search range is $B(MAX\_R*\cos(\theta), MAX\_R*\sin(\theta))$, and wherein MIN_R is the minimum measuring range, MAX_R is the maximum measuring range, and $\theta$ is a value of the angle.

15. The robot of claim 14, wherein finding out the line segment having the longest length within the search range comprises:

spacing n perpendicular lines at an equal interval within the line segment formed by the start point A and the end point B in the search range, wherein an interval between the perpendicular lines is the resolution for converting, and wherein n is a positive integer;

determining, according to linear equations of the perpendicular lines in the rectangular coordinate system, whether the point cloud data falls onto the perpendicular lines;

counting a quantity of the point cloud data on each of the perpendicular lines;

determining the perpendicular line having a maximum quantity of the point cloud data as a candidate line segment at a current angle;

calculating the candidate line segments for each angle in turn; and selecting the line segment having the longest length among the candidate line segments as a longest line segment in the search range.

16. The robot of claim 15, wherein the angle between the main traveling direction and the current orientation is an angle corresponding to the longest line segment in the search range, and wherein the initial direction is arranged as 0 degrees.

17. The robot of claim 10, wherein calculating the quantity of the point cloud data falling onto the perpendicular lines comprises:

determining whether the quantity of the point cloud data of each of the perpendicular lines is greater than a preset threshold;

determining one of the perpendicular lines as an effective perpendicular line if the quantity of the point cloud data of one of the perpendicular lines is greater than the preset threshold; and determining one of the perpendicular lines as an invalid perpendicular line if the quantity of the point cloud data of one of the perpendicular lines is not greater than the preset threshold.

* * * * *